United States Patent
Benjamin

(10) Patent No.: US 7,139,741 B1
(45) Date of Patent: Nov. 21, 2006

(54) MULTI-OBJECTIVE OPTIMIZATION METHOD

(75) Inventor: Michael R. Benjamin, Boston, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 442 days.

(21) Appl. No.: 10/631,527

(22) Filed: Jul. 31, 2003

(51) Int. Cl.
G06F 17/00 (2006.01)
G06N 5/00 (2006.01)

(52) U.S. Cl. .......................................... 706/45; 706/46
(58) Field of Classification Search ............. 706/45–46
See application file for complete search history.

(56) References Cited

U.S. PATENT DOCUMENTS 6,591,225 B1 * 7/2003 Adelman et al. ............. 700/32
6,714,319 B1 * 3/2004 Thieret et al. ............... 358/1.9

OTHER PUBLICATIONS

Benjamin,Michael. "Interval Programming: A Multi-Objective Optimization Model for Autonomous Vehicle Control" (Doctoral Thesis) May 2002.*
Zhang,B.X. and Chung,B.T.F. "A successive approximation method for solving multi-objective fuzzy optimization problems." Kybernetes, vol. 26 No. 4. 1997.*
Brown,R.J. "The Knapsack Problem" Operations Research vol. 27 No. 2. 1979.*
Arikari,F and Gungor,Z. "An application of fuzzy goal programming to a multiobjective project network problem" Fuzzy Sets and Systems. 2001.*
Dadone,P and Vanlandingham,H.F. "Non-differentiable optimization of fuzzy logic systems" ANNIE 2000. Nov. 2000.*

* cited by examiner

*Primary Examiner*—David Vincent
*Assistant Examiner*—Benjamin Buss
(74) *Attorney, Agent, or Firm*—James M. Kasischke; Jean-Paul A. Nasser; Michael P. Stanley

(57) ABSTRACT

A mathematical programming method in which a common decision space is defined by identifying decision variables, and a set of objective functions is developed as piecewise defined functions. Each objective function is dependent on at least one of the decision variables and corresponds to a goal. The objective function has a plurality of pieces, such that the objective function has only one piece for each combination of decision variables. A value function is developed in additive preference form based on weights and the objective functions. The value function is optimized by searching through the decision variable values to find the values of the decision variables that maximize the developed value function. An action dictated by the decision variable values can then be executed.

22 Claims, 12 Drawing Sheets

```
while(satisfied == FALSE)

p_i = choosePiece(S)

p_j = splitPiece(p_i)

refinePieces(p_i, p_j)

```
IPAL()
0. uninitialized = TRUE
1. for(j = 2 to k)
2.     grid[j]→initialize(universe, gel)
3.     for(i = 1 to m)
4.         grid[j]→addPiece(p(i, j))
5. for(i = 1 to m)
6.     nodeBox = p(i, 1)
7.     RIPAL(nodeBox, 2)
8. return(bestBox)
```

FIG. 10A

```
RIPAL(nodeBox, level)
0. if(level == k)
1.     if(uninitialized or nodeBox→wt > best)
2.         best = nodeBox→wt
3.         bestBox = nodeBox
4.         uninitialized = FALSE
5.     return
6. boxset = grid[level]→getBoxes(nodeBox)
7. ibox = boxset→first
8. while(ibox ≠ NULL)
9.     newNodeBox = nodeBox ∩ ibox
10.    RIPAL(newNodeBox, level+1)
11.    ibox = ibox→next
```

FIG. 10B

RIPAL(nodeBox, level)
0. if(level == k)
1.    if(uninitialized or nodeBox→wt > best)
2.       best = nodeBox→wt
3.       bestBox = nodeBox
4.       uninitialized = FALSE
5.    return
6. cheapBound = 0
7. for(j = level to k)
8.    cheapBound = cheapBound + grid[j]→getCheapBound(nodeBox)
9. if((nodeBox→wt + cheapBound) ≤ best)
10.    return
11. tightBound = 0
12. for(j = level to k)
13.    tightBound = tightBound + grid[j]→getTightBound(nodeBox)
14. if((nodeBox→wt + tightBound) ≤ best)
15.    return
16. boxset = grid[level]→getBoxes(nodeBox)
17. ibox = boxset→first
18. while(ibox ≠ NULL)
19.    newNodeBox = nodeBox ∩ ibox
20.    RIPAL(newNodeBox, level+1)
21.    ibox = ibox→next

FIG. 10C

MULTI-OBJECTIVE OPTIMIZATION METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention relates to a multi-objective optimization method that evaluates a plurality of objective functions to determine the best decision variables satisfying those objectives.

(2) Description of the Prior Art

An agent designed to operate in the real physical world, must deal with the aspect of unpredictability in the environment. An unpredictable event may be something that is out of an agent's control (a car turning into it's path) or an event that is simply left out of the agent's reasoning scope (an on-schedule train crossing its path). The ability to react to unforeseen events makes life simpler for the agent by requiring it to predict less about the world and allowing it to avoid forming contingency plans for perhaps countless possible deviations from a long term plan. The interest in behavior-based robotics is tied directly to the interest in building robots or agents that are to be situated in such dynamic environments. Brooks (1991a) stated that traditional artificial intelligence was dominated by a preoccupation with search techniques which in turn promoted an "abandonment of any notion of situatedness" since simulated environments were sufficient for test and evaluation. The behavior-based control architecture has been found by many to be a viable architecture in situations where the environment is too complex for a single comprehensive world model, and the ability to react quickly to changes in the environment is especially important. (Brooks, 1986; Rosenblatt, 1997; Arkin, 1998; Pirjanian, 1998; Riekki, 1999). Each behavior specializes in one particular aspect of the overall task of the vehicle, thereby simplifying the implementation of each behavior. Unfortunately, the behaviors often disagree on what next action is best for the vehicle and a workable arbitration scheme therefore becomes necessary. Simple arbitration schemes often either suppress all but the most important behavior, or merely average or convolve a single action from multiple behaviors, which lead to unacceptable shortcomings in overall vehicle behavior. Effective coordination of behaviors requires each behavior to not only produce the one action that best serves the goals of the behavior, but also produce alternative actions that may lead to the best overall compromise between behaviors. By rating all possible actions, the behavior is in effect producing an objective function over the domain of all possible vehicle actions, and action selection then can be viewed as a multi-objective optimization problem. Unfortunately, the action domain grows exponentially with respect to the number of action variables, and requiring each behavior to explicitly rate all actions becomes computationally infeasible in all but the simplest applications.

One architecture for solving these problems is the subsumption architecture, introduced in Brooks (1986). To overcome slow reaction times, at each layer (or behavior), there is a tight coupling between sensors and actuators, and a commitment is made only to the next action. A lower, fundamental behavior such as avoiding obstacles, could take quick control, suppressing or ignoring higher level behaviors. To overcome the pitfalls of relying on a complete world model, each behavior is responsible for taking whatever it needs from the environment for its own limited world perspective. No communication or model sharing is proposed between behaviors. The decentralized nature of the model also contributes to a modular design process and robust performance, and has the effect that overall intelligence attributed to the agent tends to be seen as an emergent property of performance, rather than due to a single grand design. A layered design implies a prioritization of behaviors and thus a policy for choosing an action when different behaviors are in conflict. Control of the vehicle alternates between behaviors while the action preferences of other behaviors are ignored completely. This can be viewed as a serious shortcoming if the desire is for the agent to react simultaneously to more than one event, or react in a way that is consistent with longer term plans.

Other models such as those taught by Arkin (1989b); Payton et al. (1990); Maes (1990), have tried to address these issues, and cooperative action selection, where an action can be influenced by two or more behaviors simultaneously, has since been common. Behavior-based implementations are typically thought of as containing a separate, distinct component responsible for action selection. As an example, the distributed architecture for mobile navigation (DAMN) proposed in Rosenblatt (1997) contains an arbiter that receives votes from each behavior. Although action selection typically is the only source of communication (albeit one-way) between behaviors, there must be some degree of uniformity in how they communicate to the action selection process, since behaviors are likely to be heterogeneous in their implementation. In the DAMN architecture, this communication comes in the form of the weighted votes over a common set of action choices known to all behaviors. In general, there is a tradeoff to be made between the complexity of the information being passed from the behaviors and the complexity burden put on the action selection method. On one hand, by emphasizing quick decisions, there is the risk of sacrificing the quality of the decision. On the other hand, by emphasizing quality decisions, there is the risk of sacrificing the quickness of the decision.

A strength of the behavior-based architecture is its modularity and ability to accept additional behaviors into an existing system without redesigning existing behaviors. Opinions have varied, however, as to what constitutes a behavior. In Brooks (1986), behaviors were devoid of any internal model or representation of the world, and behaviors were thought of as direct mappings from sensory input to actions. Brooks (1989, pp. 449–450) advocated using the world itself as the only model utilized by behaviors.

Choosing a particular action involves attempting to choose a correct action in the shortest amount of time. Various action selection methods are provided in the prior art. These methods include no-compromise methods wherein one behavior is chosen and other behaviors are ignored. The problem becomes choosing the appropriate behavior. The defect of this approach is that when one behavior is chosen, a decision that is satisfactory to many of the other behavior can be ignored because they weren't the first choice for top behavior. Compromise methods are subdivided into single fusion compromise methods and multifusion compromise methods. In single fusion compromise methods, the choices of all of the behaviors are combined as by averaging. The problem with single fusion compromise methods is that they can lead to a compromise that is unsatisfying to both behaviors. Multifusion compromise methods are divided into single dimension and high dimension methods. In multifusion compromise methods compromising is performed by considering mutually agreeable alternatives and choosing one that comes with the highest combined backing from the contributing behaviors. When this involves only one action variable, this represents a single dimension multifusion compromise method. Additional action variables give rise to high dimension multifusion compromise methods. A primary problem of these methods is the computational burden required to determine the action variable in a timely manner.

The competing actions can be determined by implicit evaluation and explicit evaluation. Voting is one explicit evaluation method in which each behavior function votes for an action. In voting, each possible action is explicitly evaluated to provide a candidate, and the candidate receiving the most votes is chosen. Voting can be applied to all forms of behavior functions but it is computationally intensive. Implicit evaluation can be performed by using analytical methods to find local maxima. These local maxima can be used to represent a large number of possible actions thereby speeding the decision process. However, local maxima are not easily determined for all forms of behavior functions.

SUMMARY OF THE INVENTION

Accordingly, it is a general purpose and primary object of the present invention to provide a multi-objective action determination method.

Another object of the invention is that such method be relatively quick.

A further object of the invention is to provide a multi-objective action determination method that is applicable to any form of behavior function.

Accordingly, this invention provides a mathematical programming method in which a common decision space is defined by identifying decision variables, and a set of objective functions are developed as piecewise defined functions. Each objective function is dependent on at least one of the decision variables and corresponds to a goal. The objective function has a plurality of pieces, such that the objective function has only one piece for each combination of decision variables. A value function is developed in additive preference form based on weights and the objective functions. The value function is optimized by searching through the decision variable values to find the values of the decision variables that maximize the developed value function. An action dictated by the decision variable values can then be executed.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 4 provides the basic algorithm for developing a piecewise defined function;

FIGS. 10A, 10B, and 10C provide algorithms for searching the decision space.

DESCRIPTION OF THE PREFERRED EMBODIMENT

The current invention is described hereinafter as interval programming. A main concept of interval programming is the use of piecewise defined objective functions. The motivation for this is the relative flexibility of these functions in approximating any underlying function. Although there is a cost in precision in representing functions this way, we provide algorithms for guaranteeing global optimality when combining the set of interval programming objective functions. In this disclosure, interval programming functions will be introduced, interval programming problems are defined, and finally alternative approaches will be discussed.

Figure 1:
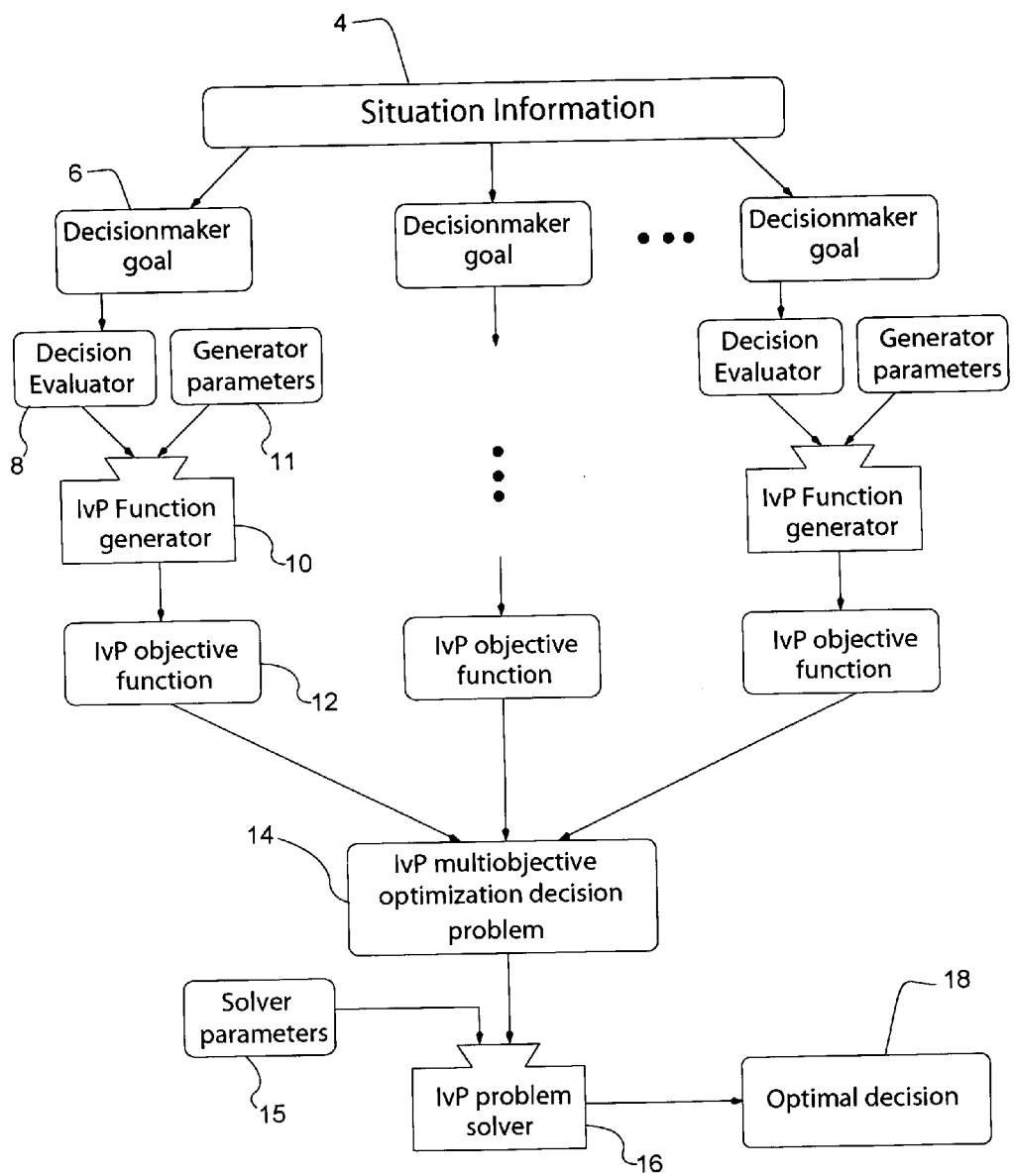
FIG. 1 is a diagram of an application of the multiobjective optimization method of the current invention.

In FIG. 1 there is shown an application of the multi-objective optimization method of the current invention. As an initial step 4, environmental information is received for the entire decision space. Decision-maker goal functions 6 act on the environmental data 4 to provide a decision evaluation 8. In step 10, interval programming functions are generated for each decision evaluation 8 based on selected generator parameters 11. These generator parameters 11 are selected to determine the nature and fineness of the resulting interval programming objective function. As a result of step 10, interval programming objective functions 12 are created for each decision-maker goal 6. These interval programming objective functions 12 are joined together as an interval programming multi-objective optimization decision problem 14. Problem 14 is provided to an interval programming problem solver 16 which solves the problem using various solver parameters 15. These parameters 15 can control the acceptable error and the speed of problem solution. The solution of the problem is provided as an optimal decision 18. Additional detail and guidance concerning this flowchart will be provided below.

An interval programming function is piecewise defined such that each point in the decision space is covered by one and only one piece, and each piece is an interval programming piece. An interval programming piece is given by a set of intervals, one for each decision variable, and an interior function evaluating each point in the piece. Each decision variable has a bounded, uniformly discrete domain. Each interval may be defined over a single decision variable, or over a single function, where such a function is defined over one or more decision variables. A piece using exclusively the former such interval is called a rectilinear piece. The term non-rectilinear piece is used otherwise. In a general (non-interval programming) piecewise defined function, the value of the function may be given for certain regions of the domain, with a default value given for all other regions. For example: "f(x; y)=25 if x≦15 and y>0;−25 otherwise.". This is not allowed in interval programming functions, by the two definitions above.

Decision variables in interval programming functions are assumed to be bounded and uniformly discrete. This assumption has three motivations. The first is that, in autonomous vehicle control problems, the decision variables typically correspond to actuator settings, such as course or speed of the controlled vehicle. The precision of such actuators has a natural limit such as 0.5°, or 0.1 knots. A decision recommending a new speed of 12.7863 knots is useless, unless the vehicle can confidently execute that request.

The last two motivations are due to implementation considerations. With a uniform discrete domain, all intervals can by represented using only inclusive bounds. Because each point in the decision space must belong to at least one interval programming piece, in continuous space, the set of pieces would need to utilize both inclusive and exclusive bounds to uphold this property. For example, if the domain [0; 10] is uniformly discrete, containing only integers, it can be represented with two intervals 0≦x≦5 and 6≦x≦10. If it were continuous, exclusive bounds would be necessary, as in the pair 0≦x≦5 and 5<x≦10. By needing to use only inclusive bounds, each interval, x−≦x≦x+, need only store the upper and lower bound information, and can omit the two other boundary flags that would otherwise be needed to distinguish between x−<x≦x+, or x−<x<x+. Since large numbers of pieces are typically involved in interval programming problems, this simplification results in a significant reduction of memory size. The last consideration is that, with uniform discrete domains, each piece represents a finite number of elements (decisions), making small brute-force calculations possible in limited circumstances.

Figures 2A, 2B, 2C:
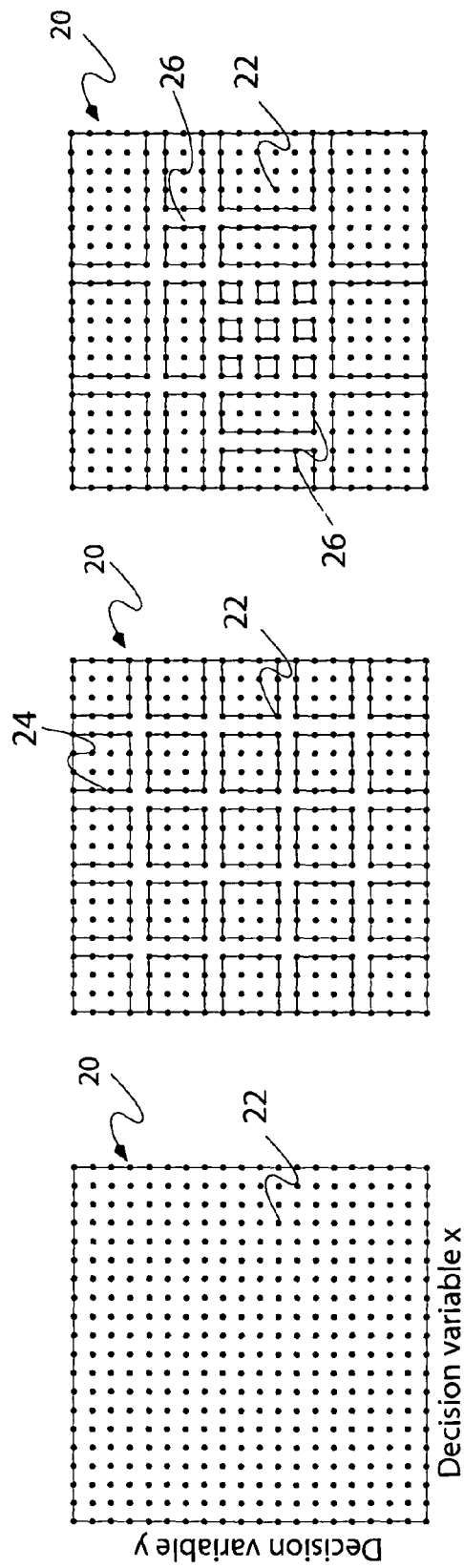
FIG. 2A shows a two dimensional decision space having a uniform discrete domain.
FIG. 2B shows a two dimensional decision space having a piecewise defined function with uniform pieces.
FIG. 2C shows a two dimensional decision space having a piecewise defined function with non-uniform pieces.

It is important to note the distinction between uniform discrete variable domains and uniform interval programming pieces. In FIG. 2A, a two dimensional decision space 20 is depicted with a uniform discrete domain having a plurality of points 22. In FIG. 2B, a piecewise defined function using uniform pieces 24 is depicted. In FIG. 2C a piecewise defined function using non-uniform pieces 26 is shown. The use of non-uniform pieces 26 allows the use of more pieces in areas where the function is more "interesting", i.e., less amenable to approximation by a linear function. The creation of uniform pieces 24 can be extremely quick, however. The issues of uniformity, precision, and speed, are discussed again, hereinafter.

There is a basic tradeoff in interval programming functions between accuracy and speed. More pieces mean longer solution times but also a greater capacity for accuracy in representing functions. There are ways, however, to both increase the accuracy and the speed at the same time. This is done by using more "powerful" pieces, by either using a better interior function or a better piece boundary.

Figure 3C:
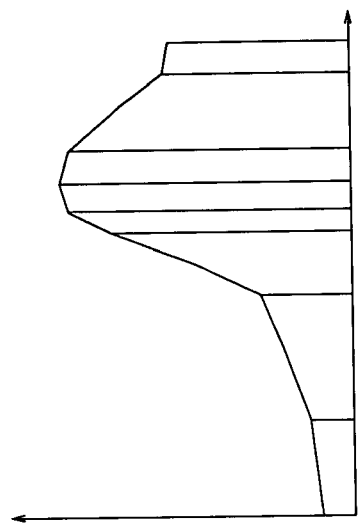
FIG. 3C is a graph of an objective function represented as a piecewise linear function.
Figure 3B:
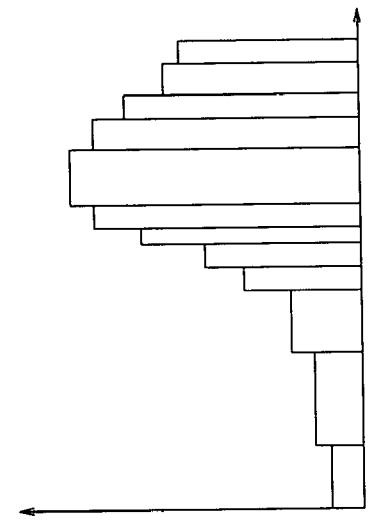
FIG. 3B is a graph of an objective function represented as a piecewise constant function.
Figure 3A:
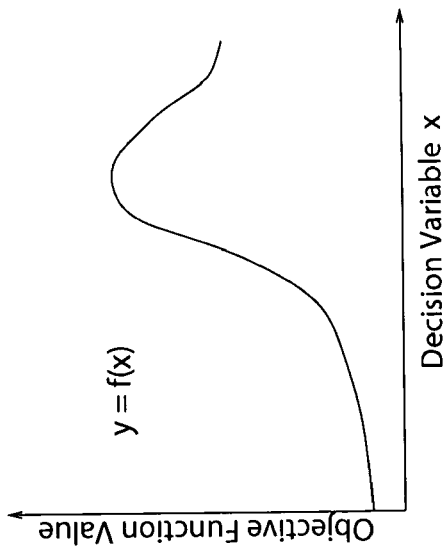
FIG. 3A is a graph of an objective function.

The simplest way to improve interval programming functions is to use linear interior functions within each piece as shown in FIG. 3A, FIG. 3B and FIG. 3C. FIG. 3A shows the original objective function, FIG. 3B shows a piecewise constant representation of the objective function, and FIG. 3C shows a piecewise linear representation of the objective function. Practical experimental results have shown that this improvement is both faster and more accurate than the use of constant values. These experimental results are available in M. Benjamin, Doctoral Thesis entitled *Interval Programming: A Multi-Objective Optimization Model for Autonomous Vehicle Control* (2002) (available from the Brown University Library) which is incorporated by reference herein. The use of piecewise linear functions introduces a bit of new complexity in each step of the solution process, but typically the number of overall steps is drastically reduced, resulting in an overall reduced solution time. There is also more complexity introduced in translating a non-interval programming function into an interval programming function.

Taking simple intervals over decision variables results in pieces with rectilinear edges, i.e., rectangles with edges parallel to the variable axes. In addition to altering the interiors of the pieces, the use of non-rectilinear edges can also greatly increase the expressive capacity of each piece. As with the use of linear interiors, the aim is to increase the expressive capacity of interval programming functions while reducing the solution time in solving interval programming problems. This is done by allowing pieces to be composed of intervals not only over the variables, but also over functions of the variables.

An interval programming problem is composed simply of a collection of interval programming functions and an associated weight, or priority, for each objective function. Each function is typically a reflection of an objective or goal of the decision maker or autonomous agent, and each priority reflects the relative importance of the goal, given the situation or context.

An interval programming problem consists of a set of k piecewise-defined objective functions. Each objective function, defined over n decision variables ($x_1$; . . . ; $x_n$), has an associated priority weight ($w_i$). The general form is given:

maximize $w_1 f_1(x_1; \ldots ; x_n) + \ldots + w_k f_k(x_1; \ldots ; x_n)$ such that $f_i$ is an interval programming piecewise defined function, and $w_i \in [0, +\infty]$.

Solving interval programming problems, and achieving global optimality is discussed below. Note that the definition given above assumes an additive preference structure. Issues concerning this are also discussed below. Note also that interval programming problems do not contain a feasible region as in the general optimization model and multiple criteria decision making (MCDM) models. This issue is discussed more fully below.

A solution to an interval programming problem is the single decision ($x_1$; . . . ; $x_n$) with the highest value, when evaluated by $w_1 f_1(x_1; \ldots ; x_n) + \ldots + w_k f_k(x1; \ldots ; xn)$. Note that the assumption of uniform, discrete variable domains opens the door to brute force, exhaustive searches of the decision space, and thus "globally optimal" solutions. Of course such searches need to be avoided for practical reasons. If limited to brute force search, time constraints will confine an application to the use of very small decision spaces of one or two variables as used in voting methods and action maps.

In interval programming problems, there is a second way of viewing the definition of a solution. Note that, given the definition of an interval programming function, each decision point lies in exactly one piece from each function. So the second way to view a solution is the set of k pieces, one from each function, that each contain the best decision. This means that the "solution space" is the set of all possible combinations of pieces from each function. Admittedly, this space can be much bigger than the decision space, but this second view opens the door to a different kind of search, while still guaranteeing global optimality.

By the definition of an interval programming problem, it is apparent that the value function is fully specified and indicates an additive preference structure. As Miettinen (1999, p. 21) points out: "If we had at our disposal the mathematical expression of the decision maker's value function, it would be easy to solve the multi-objective optimization problem. The value function would simply be maximized by some method of single objective optimization". This may cause one to question whether the interval programming model is best thought of as an MCDM model. This situation is not surprising since the primary motivating application is autonomous vehicle control, where there is no decision maker in the loop, and the agent must simply take its best shot on determining its value function, and then generate an answer as quickly as possible.

In the case where there is a decision maker in the loop, the value function, while fully specified initially, may in fact change as a result of interaction with the decision maker. This is the intended scenario in the cases where interval programming is used for simulation-based design applications. As Miettinen (1999, p. 21) goes on to say: "There are several reasons why this seemingly easy way is not generally used in practice. The most important reason is that it is extremely difficult, if not impossible, for a decision maker to specify mathematically the function behind her or his preferences. Secondly, even if the function were known, it could be difficult to optimize because of its possible complicated nature." In this vein, its worth noting that the result of adding two or more piecewise defined functions is not another piecewise defined function, unless the configurations of pieces from each function are identical. Two pieces from two functions, if they overlap, typically do not overlap precisely. Thus the solution is not to create a single new piecewise defined function from the expression $w_1 f_1(x1; \ldots; xn) + \ldots + w_k f_k(x1; \ldots; xn)$ because this results in a growth in new pieces that is potentially exponential in the dimension of the problem. Furthermore, the interval programming model or its solution algorithms is not limited to this structure; however, care must be made however in cases where two objective functions are derived from two behaviors where the goals have an "either/or" relationship. In this case, the likely remedy is to combine these behaviors into a single behavior.

A conspicuous feature lacking in the definition of an interval programming problem is the feasible set S, which is a key component in the general optimization and MCDM models. A feasible set ensures that decisions that go beyond being undesirable, and are outright not permissible, or even nonsensical, are never solution candidates. The feasible set is also, based on its form, a way of guiding the search for the actual solution. In the simplex method for linear programming, for example, the solution process progresses from one vertex of the feasible space to another. But as useful as this may be, assumptions about a feasible region within a model may disqualify its use entirely. For example, discontiguous, or non-convex feasible regions are not handled in most models, but arise naturally in applications in vehicle control. Constraints in interval programming problems are represented by individual pieces or groups of pieces within an interval programming function that contain a negative-infinity value as an interior function. In practice, some value, M, that is sufficiently large, depending on the number of objective functions, will suffice to represent infinity. The result is that constraints hold no special status in interval programming functions, the implied feasible space plays no explicit role in the solution process, and the use of interval programming is in no way dependent on the nature of constraints in any potential application. This is not to say however that "constraints" that exclude large portions of the decision space have no impact on solution speed in interval programming problems.

One of the steps of this invention is creating a piecewise defined objective function. The objective function typically is an approximation of some underlying function, and typically is generated through some automation process. In creating interval programming functions, three competing objectives are present. The formulated problem should be accurate, as well as not time-consuming to create, and not time-consuming to solve. The relationship between these three objectives is played out primarily in the number of pieces in each function, as well as the effort spent in choosing better piecewise configurations. The choices of piece shape and interior function are also important, but less contentious. Building interval programming functions is the first of the two most computationally expensive parts of forming a control loop for a system utilizing multi-objective optimization. This stage may seem counter-intuitive at first since inaccuracies and time is added to a process in which we primarily seek to minimize loss of accuracy and time. The justification for this is the need for an overall method that is fast, accurate, and flexible by making small sacrifices in each to achieve the right mix of the three. In a piecewise defined function, the number and shape of pieces, and their interior functions are resources that determine the capacity for accurately expressing an underlying function. These resources also affect the solution time when combining this particular function with others in an interval programming problem. The process of choosing a particular configuration of pieces also can vary in time and effort, and directly affects the degree to which the capacity for accuracy of the function is realized. The use of more resources means the ability to achieve a greater accuracy quicker. In solving interval programming problems, the use of greater resources, translates into longer solution times. The capacity for accuracy is bounded by the resources available, and the quality of the algorithms. These algorithms are discussed next.

FIG. 4 provides the basic algorithm for developing a piecewise defined function. The algorithm is initialized with a piecewise defined function. The set of pieces, S, initially contains only one piece (the entire decision space) and some arbitrary interior function. The function choosePiece (S) chooses one piece out of the set of pieces, S. The function splitPiece ($p_i$) determines whether and how to split piece $p_i$. The refinePieces ($p_i, p_j$) function chooses the new interior function for the piece. Finally, the result is applied to the set of pieces S. The algorithm is repeated until accuracy or time conditions are satisfied.

The piece selection, piece split and piece refinement algorithms are provided below; however, there are many different ways to implement these aspects, so the discussion herein should not be taken to limit the invention to these algorithms.

The simplest way to program the selectPiece algorithm is to pick a piece randomly. There are two ways to do this. A random piece in the set S could be selected. When S is an array, this is very quick and simple. The second way to select a random piece is to generate a random point in the decision space, and then find out what piece it currently belongs to. This has the advantage that larger pieces (with typically more error) will have a greater chance to be selected. The drawback is that, given a point in the decision space, it is not trivial to determine which piece it corresponds to. For example, we would not want to search through an array representing S after selecting each point. In the preferred method maintaining a grid structure corresponding to S makes this process less difficult.

As a preferred method, the randomly chosen piece is sampled to see how well the piece currently reflects the underlying function. After examining a certain number of pieces, we then choose to proceed with the worst piece. The worst piece can be determined by choosing a number of sample points within the piece. The number of points is chosen as a balance between speed and accuracy. The chosen points are evaluated based on the piece interior function against the underlying function, to give a measure of error. Bad pieces from the previous iteration that fell just short of being the worst are remembered between iterations as being good candidates for choice in the current iteration. This preferred method is implemented as a special "fixed-length" priority queue of prime candidates for refinement.

The simplest way to program the splitPiece algorithm to split a piece is to split it in half along a randomly chosen dimension. Another way is to split it along the longest dimension, keeping its aspect ratio to a minimum as a rule of thumb. Of course, if there is some knowledge of the underlying function that can be capitalized on, this may allow for a more intelligent choice. Another choice is to try different splits and refinements, and choose the best configuration. In the preferred method, pieces are generally split along the longest dimension while randomly breaking ties.

The refinePiece algorithm chooses a new interior function by selecting enough points in the piece, and based on their evaluation by the underlying function, choosing the best parameters for the new interior function. In the case where the interior function is a constant value, the average of the selected points can be chosen, or another number can be chosen that minimizes the worst error. In the case of linear interior functions, the preferred method is to first evaluate each corner of the piece (using the underlying function). Next appropriate sets of n+1 points are chosen which determine a (hyper)plane in n dimensions, and the coefficients of the linear function are averaged. Another issue is how many of these sets to sample, since the number of subsets grows exponentially. In practice, we sample 2n−1 of the $2^n$ subsets.

The simplest criteria for halting the loop is when some pre-allocated limit has been reached, either on the number of pieces or time. A more difficult criteria may be based on the measured accuracy of the piecewise defined function in representing the underlying function. Unless an exhaustive evaluation of each point in the decision space is carried out, it is difficult to precisely assess the accuracy of the function. However, through sampling enough of the space, a picture of the situation can be drawn despite the lack of an absolute guarantee. In the preferred method, the algorithm is halted when a certain amount of pieces have been generated.

The accuracy of an interval programming function, $f(x_1; \ldots; x_n)$ in representing another function $g(x_i; \ldots; x_n)$ is measured by selecting some or all of the points $(x_1; \ldots; x_n)$ in the n-dimension domain, evaluating each using f and g, and tallying their (absolute) difference. Primarily, the concern is how well the approximation performs on average (avgErr), as well as in the worst case (worstErr). In testing, both are recorded, but use another single number (repErr) that is a combination of the two, in most of the reporting. They are defined as follows: The average error, avgErr, over s sample points is computed by the following:

$$avgErr = \frac{1}{s}\sum_{i=1}^{s} |f(x_i) - g(x_i)|.$$

The worst error, worstErr, is simply the worst error of all the sample points. The combined error, repErr, is a combination of the two given by: avgEr≦(0.1)worstErr.

Uniform piecewise constant functions, uniform piecewise linear functions and non-uniform piecewise linear functions have been compared experimentally. Piecewise constant functions have been found to be dominated by piecewise linear functions with respect to capacity for accuracy and creation time. It was also found that, in some cases, better accuracy can be achieved with the non-uniform pieces, in less time, and using fewer pieces. In other cases, a tradeoff is apparent. At this point, no conclusion can be reached on whether the non-uniform pieces are always worth the extra time for the sake of extra accuracy. Methods used here for generating non-uniform piecewise functions can be improved reducing the effort involved in developing the functions. Hybrid methods can also be used by covering the space initially with a set of uniform pieces, and then dedicating an additional number in a non-uniform manner. Different objective functions, from different behaviors/goals, will likely need to dedicate pieces in different ways. In loosely coupled problems, for example, some functions are defined over only a subset of the variables. Certainly, uniformity across these functions in loosely coupled problems is a waste of resources.

Once the objective functions are developed, the interval programming problem can be solved by finding a point in the decision space with the optimal combined value from each interval programming objective function. The preferred method of finding this solution is use of an algorithm with the overall structure of branch and bound. Two alternative solution methods are also provided, and methods and performance are compared.

In the preferred method, the search space is the set of all possible combinations of m pieces from each of the n objective functions, which is referred to as the combination space. Given that there are m pieces in each function, the size of this space is $m^n$. As a simple example problem with 5 decision variables, each with 200 elements in its domain of [0; 199]. The size of the decision space is $200^5 = 6.4 \times 10^{11}$. With eight interval programming functions with 100,000 pieces each, which makes the average piece have the size 20× . . . ×20. The size of the combination space is $1 \times 10^{40}$. The search space is chosen as the combination space rather than the decision space in order to simplify the search algorithm as discussed hereinafter.

Figure 5A:
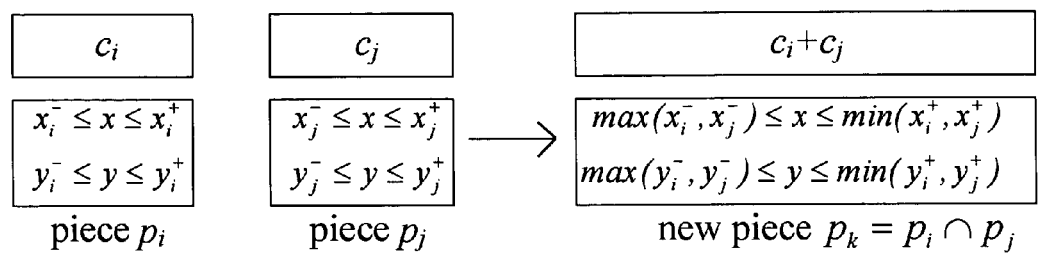
FIG. 5A is an algorithmic depiction of the intersection of two two-dimensional rectilinear pieces.
Figure 5B:
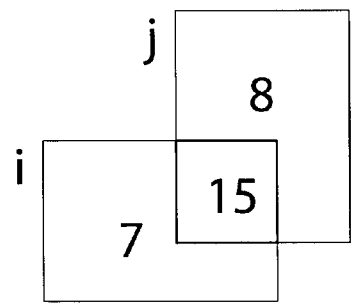
FIG. 5B is an graphic depiction of the intersection of two two-dimensional rectilinear pieces.

The intersection of two pieces from different objective functions is a core operation in interval programming algorithms. The intersection of two rectangles is simply the rectangular region of overlap, if they indeed overlap. In FIGS. 5A and 5B the intersection of two two-dimensional rectilinear pieces is respectively depicted algorithmically and graphically.

In FIG. 5A, $c_i$ and $c_j$ represent values of the objective function. $p_i$ and $p_j$ are the pieces. Intervals for each piece, $p_i$ and $p_j$ are given by the upper and lower bounds of each dimension of the pieces. These are $(x_i^+:x_i^-, y_i^+:y_i^-)$ and $(x_{j+}:x_j^-, y_j^+:y_j^-)$ respectively for pieces $p_i$ and $p_j$. A piece is non-empty if, for each of its intervals v−≦v≦v+, it holds that v−≦v+. A new piece, $p_k$ is formed at the intersection of the two pieces. The value of the objective function at this intersection is given by $c_i+c_j$. The interval of the new piece is the maximum of the two lower bounds and the minimum of the two upper bounds. For pieces with linear interiors, the only difference is the addition of the two linear interior functions, replacing "$c_i+c_j$" in FIG. 5A. In FIG. 5B, piece i is shown having a value of 7. Piece j is shown having a value of 8. The pieces intersect at region k. The value at this region k is the addition of the two values, 15.

Figure 6:
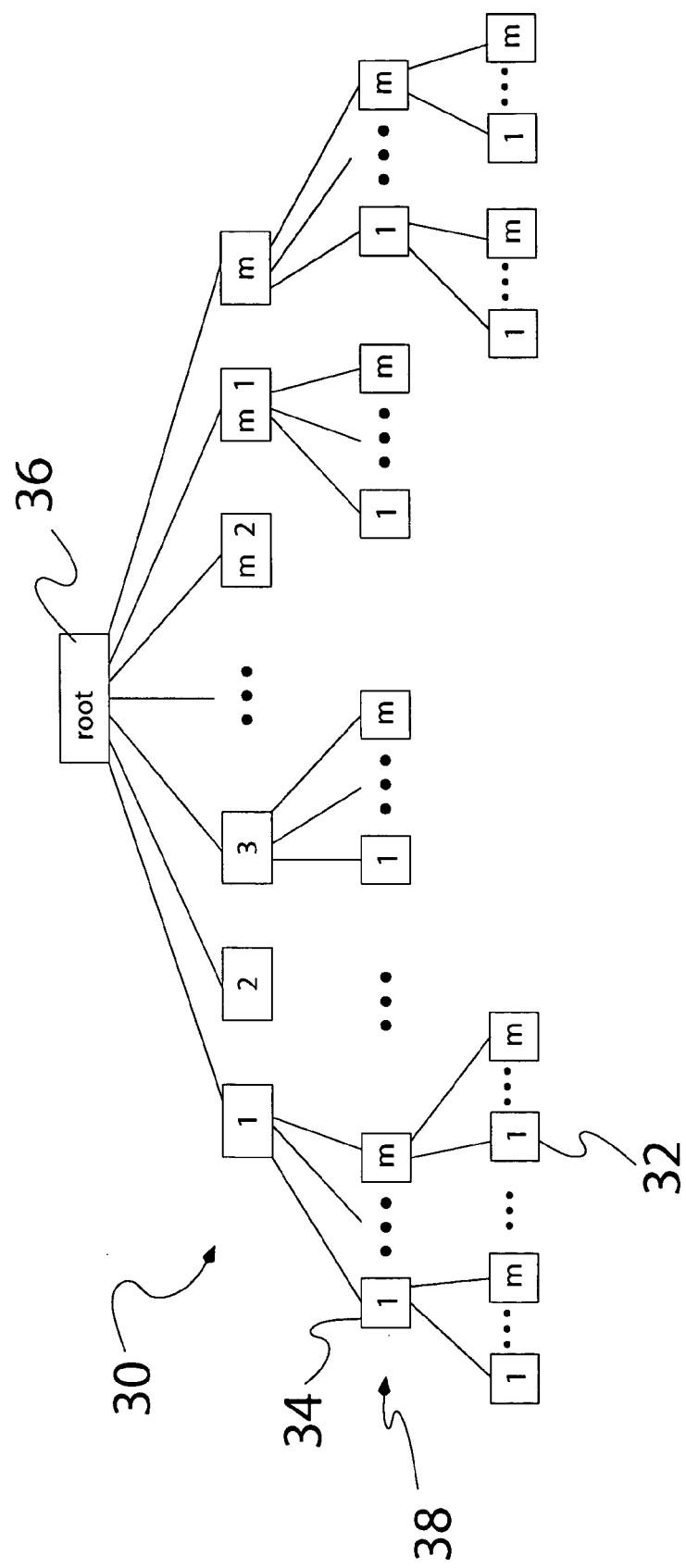
FIG. 6 is a tree structure depicting the combination space.

The combination space corresponds to the tree structure 30 shown below in FIG. 6, where each leaf node 32 corresponds to a combination of n pieces where n represents the number of objective functions. In FIG. 6, n is equal to 3. Each node 34 in the tree 30, except for the root node 36, corresponds to a single piece in some interval programming objective function, referred to as the nodePiece. Each layer of nodes 38 represents all of the possible pieces (1 . . . m) of the layer's objective function for each piece at the parent layer. Each node 34 also has a nodeBox associated therewith, which is the intersection of its nodePiece and its parent's nodeBox. The values of points inside a nodeBox are given by the sum of the interior functions of each contributing nodePiece up the tree. The expression nodeBox→wt refers to the maximum weight of all such points, based on this combined function. (The nodeBox of the root is the universe, i.e., whole decision space, and the nodeBox and nodePiece for nodes at the first level are equivalent, i.e., contain the same points in the decision space.)

There are many possible algorithms to search through the combination space to obtain the decision variables giving the solution to the interval programming problem. Several of these algorithms are given by M. Benjamin, Doctoral Thesis entitled *Interval Programming: A Multi-Objective Optimization Model for Autonomous Vehicle Control* (2002) (available from the Brown University Library) which is incorporated by reference herein.

In the preferred method, grid structures are used to facilitate the retrieval of two types of information at each (non-root, non-leaf) node 34 in the search tree. Any one of the m children can be pruned because, either it doesn't intersect the nodeBox associated with its parent, or all of its associated leaf children are hopelessly inferior to a previously-found solution. One non-preferred alternative is to simply check each of the m children to see if they intersect with the parent box, but, in practice, the great majority do not intersect. In the preferred embodiment grid structures are used to drastically reduce these m checks at such nodes. Without them, even with an interval programming problem with only two objective functions, our algorithm would be $O(m^2)$, with typical runs consistently at worst case performance. Furthermore, the grids can be used to quickly obtain an upper bound on solution for a particular node before any of the m children are tested for intersection. The construction and format of a grid is given in the ensuing text followed by discussions of the use of the grid for intersection tests, and bounding are discussed, as well as, issues concerning the proper choices of grid parameters.

In the preferred method, grids are composed of a multi-dimensional array of "grid elements", with two pieces of information associated with each element: gridVal and gridList. The latter is an initially empty linked list. When a piece from an objective function is added to a grid, the set of grid elements related to the piece is determined, and then the piece is added to the linked list of each such grid element. The value of gridVal indicates the maximum value across all pieces contained in the gridList. When a piece from an objective function is added to a grid element, the maximum point within the piece is compared to the current gridVal, and updated if greater. For piecewise linear functions, the maximum point within the piece is first determined (always a corner). No check, however, is made as to whether this point is actually inside the grid element.

Figures 7A, 7B:
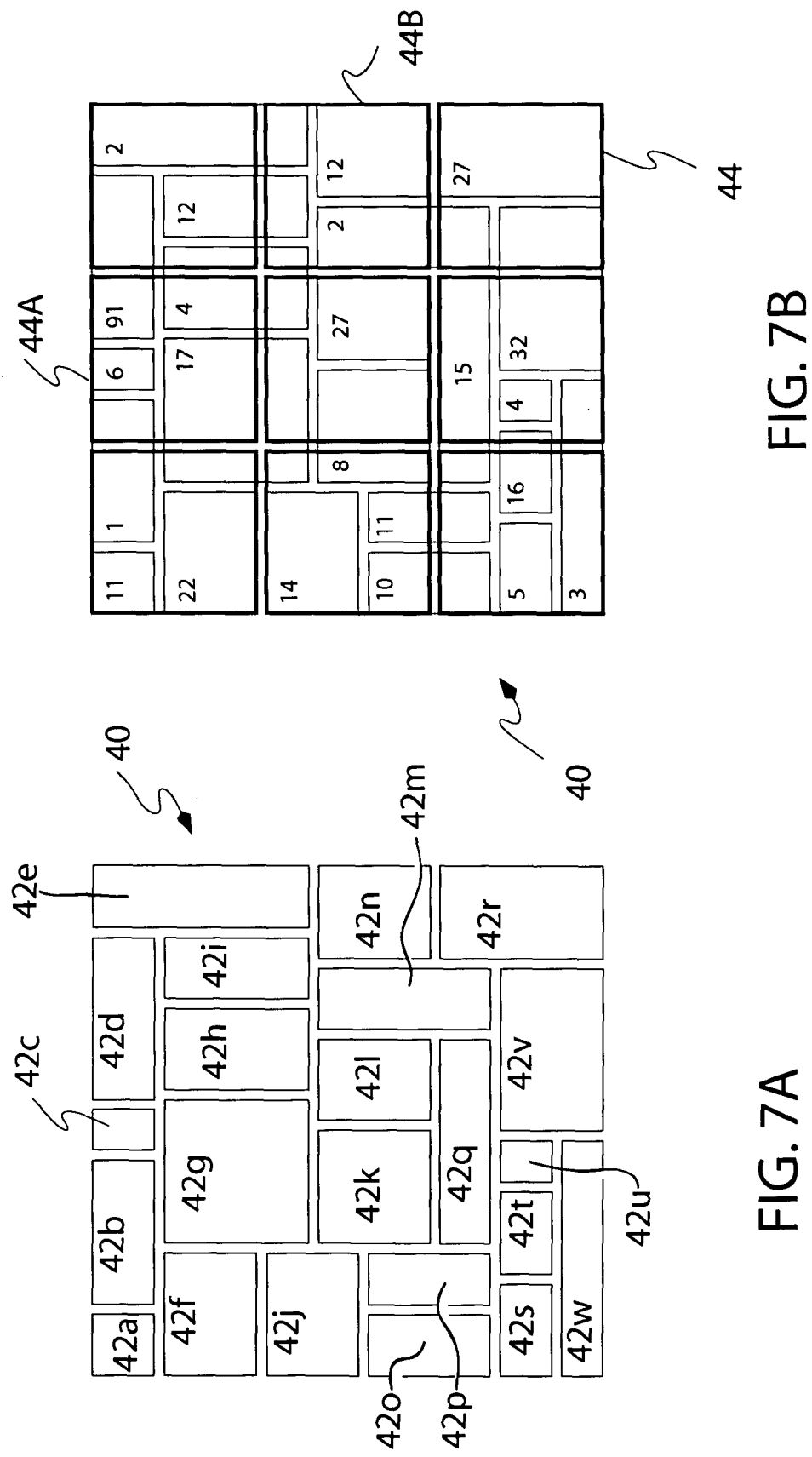
FIG. 7A shows a two dimensional objective function.
FIG. 7B shows a two dimensional objective function with grid elements superimposed thereon.

FIG. 7A shows an example of a two dimensional objective function 40 having pieces 42a–42r. FIG. 7B shows the same example with grid elements 44 superimposed on pieces 42a–42r. Each piece 42 has a value indicated by a number within the piece. The top grid element 44a in FIG. 7B, has the gridList containing pieces 42b, 42c, 42d, 42g, and 42h, and the right-most grid element 44b has the gridList containing pieces 42h, 42i, 42e, 42m, 42n. Note that piece 42h belongs to both gridLists. The gridVal associated with grid element 44b would be 12, the maximum of the values of the pieces (4, 12, 2, 2, 12).

The grid is initialized by relation to the Cartesian product of each variable's domain, universe, and the size of each grid element, gel. The universe is equivalent to the domain of the corresponding objective function, and is also identical between objective functions within an interval programming problem. All grid elements within a grid will be the same size, provided that they divide evenly into the universe. In unevenly divided universes, grids extending beyond the universe will be truncated resulting in smaller, non-uniform grid elements.

The uniformity of all but possibly the highest indexed grid elements is an important property that allows a given interval programming piece to be processed directly to determine which grid elements it corresponds to. Adherence to this property, for example, means that the grid elements are as close to being identical as possible. In an alternative embodiment, grid elements can be shaped in a more equitable way, which generally speaking, results in a more efficient grid; however, in the preferred embodiment, preserving the relationship between the size of each grid element, gel, and the distribution of pieces in the underlying objective function is more important than improving the equity between grid elements. Accordingly, the initialization function does not override the requested gel size for the sake of such equity.

Figure 8B:
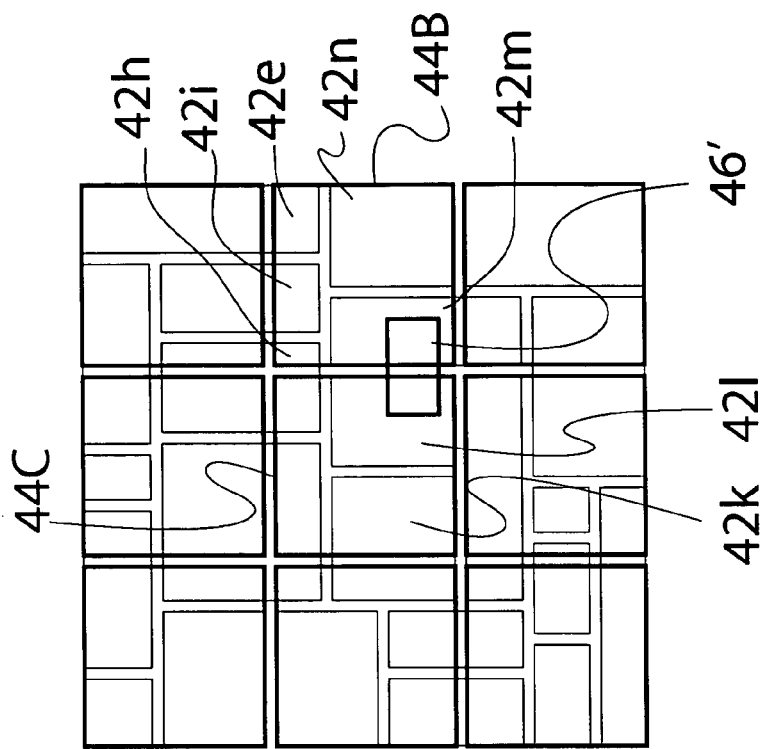
FIG. 8B shows a query box intersecting two grid elements.
Figure 8A:
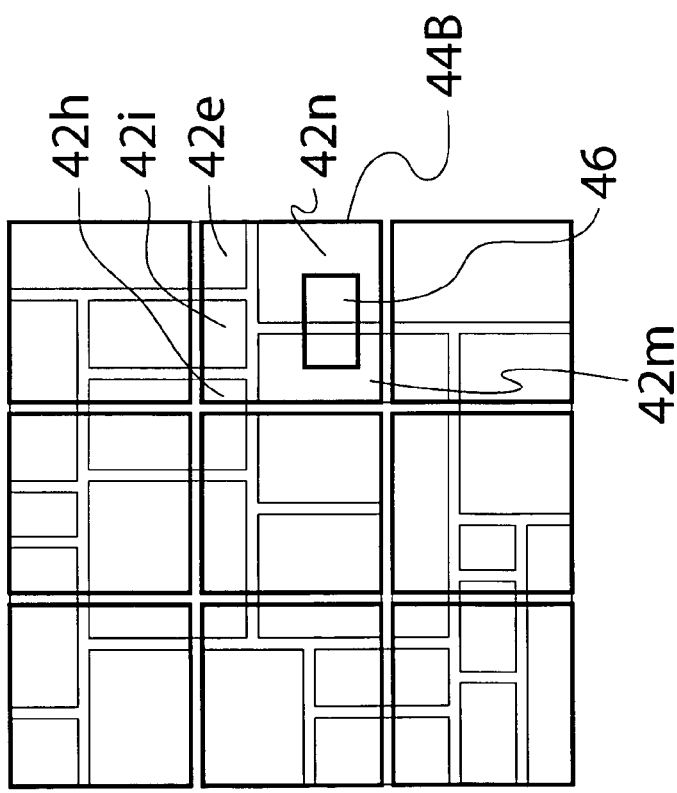
FIG. 8A shows a query box intersecting a grid element.

One important use of a grid is to query which boxes intersect with a provided query box. In the example depicted in FIG. 8A, the query box 46 intersects one grid element 44b containing pieces 42h, 42i, 42e, 42m and 42n. Individual pairwise intersection tests are performed on these five, with the returned list being 42m and 42n. In the second case, in FIG. 8B, the query box 46' intersects two grid elements 44b and 44c. The concatenation of lists from these two grid elements 44b and 44c is 42g, 42h, 42k, 42l, 42h, 42i, 42e, 42m, and 42n, which contains piece 42h twice. This algorithm must then go through this list to remove duplicates. In practice this is done before the pairwise intersection tests are performed. In this simple case, the cost in removing duplicates is negligible, but in problems with higher dimensions (usually coarser grids) and more pieces, the removal of duplicates may consume a significant amount of time. After removing duplicates and performing the intersection tests, it is found that 42l and 42m intersect the query box.

The second primary use of the grid structures is to find an upper bound associated with a particular search node. Recall the situation shown in FIG. 6, where a particular node has m children. If an upper bound on all leaf children is shown to be poorer than an already-found solution, backtracking can be invoked immediately, precluding any further intersection tests and branching below the current node. The tighter the bound, the more likely that pruning opportunities will be identified and taken advantage of.

However, typically, the better the quality of the bound, the more expensive the cost of each node that is actually expanded. In the preferred embodiment two bounds are provided, one that is cheap and loose, and one that is more expensive but tighter. The idea is to try the cheap one first to catch a large portion of cases, and use the expensive one next in those rarer cases that get by the first pruning attempt.

Figure 9:
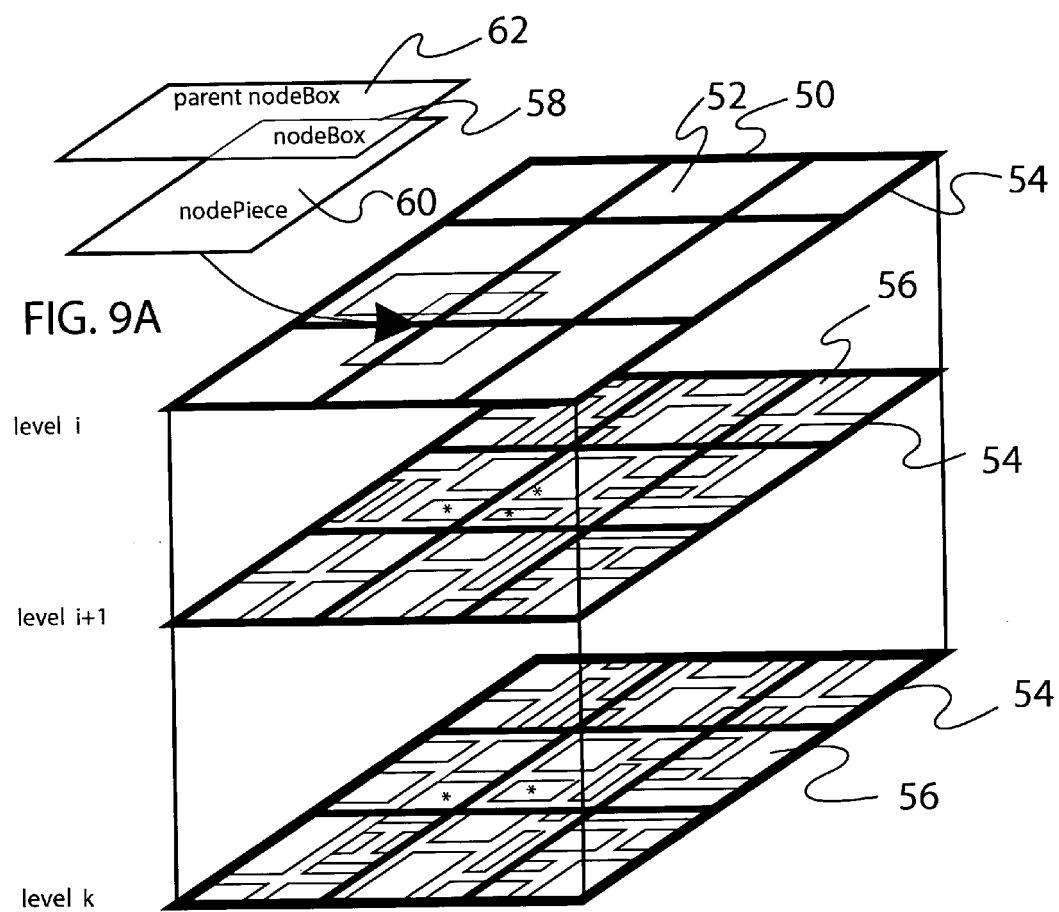
FIG. 9 shows a grid overlayed on an arbitrary node.

In the example shown in FIG. 9, the situation for an arbitrary node at level i is depicted. A grid 50 having a plurality of grid elements 52 is imposed on each layer 54. Layer 54 represents one objective function. Each layer 54 has a plurality of pieces 56. FIG. 9A provides a detail showing a nodeBox 58 as the intersection of the nodePiece 60 associated with the node, and the parent's nodeBox 62. This intersection region 58 is the query box used for obtaining an upper bound.

The cheap bound can be obtained by finding the maximum of the values of all grid elements 52 that intersect this query box 58 for the objective function. In the example in FIG. 9, there are only two grid elements 52 that intersect the query box at each level. So for a problem with k objective functions, the upper bound for this node would be given by a summation of the best grid elements 52 at each layer 54. This bound is extremely quick to obtain because the values associated with each grid element are set once, when the grid is built, and populated with pieces from each objective function. It is a looser bound because the grid value for each grid element may be based on a piece that does not in fact intersect the query box.

A tighter bound can be obtained by using the maximum weight of the pieces 56 that pair-wise intersect the given query box 58 for objective function j. Obtaining this bound is typically much slower due to the pair-wise intersection tests performed on all pieces 56 found in each grid element 52. In the example in FIG. 9, there are ten pieces 56 at level i+1, and eight pieces 56 at level k that must be pair-wise tested for intersection. Note that the returned bound is progressively tighter as the size of the query box shrinks. Since the query box does indeed shrink deeper into the tree, bounding (both kinds) gets tighter as well. If the query box is a point box (containing one point in the decision space), the tight bound is perfect in the piecewise constant case, but not in the piecewise linear case.

The three issues of grid efficiency, grid element layout, and semi-uniform interval programming functions can be tied together to improve efficiency. By grid efficiency, we mean the speed and accuracy in retrieving intersection and bounding information from the grid as discussed above. Semi-uniform interval programming functions are created by allocating an initial portion of the total number of pieces to represent the underlying function in a uniform piecewise manner. The piece distribution is initially perfectly uniform. Additional pieces are created by splitting the original pieces and their descendents. The additional pieces are allocated disproportionately to areas of the function domain producing higher boost in the accuracy representing the underlying function. Grid efficiency can be dramatically improved if the grid element layout is aligned with the layout of pieces in the interval programming function. In creating the interval programming function, the piece size used in the initial uniform function is retained and used as the grid element size argument in initializing the grid elements as discussed above.

This alignment makes intersection queries quicker because no piece resides in more than one grid element.

Recall that the returned list from an intersection query is the concatenation of lists taken from each grid element intersecting the query box. If a piece may reside in more than one grid element, then duplicates must be checked for and removed from the resulting list. The alignment also makes the bounding queries more efficient. When a piece is added to the grid, the upper bound for the grid element is based on the maximum value of the linear interior function of the piece. If a portion of the piece lies outside the grid element, then the bound may not be as tight as it could be. This situation is eliminated when the grids are aligned. In general, comparing two grids with the same number of grid elements, each holding the same pieces from the same objective function, the grid with the lower average number of pieces per grid element will be the more efficient grid. Aligning the grid element boundaries with a semi-uniform interval programming function typically reduces this ratio dramatically.

These optimizations result in algorithms shown in FIG. 10A, FIG. 10B and FIG. 10C. In these FIGS. IPAL( ) is the main solution search function. This function sets up the root node and launches a recursive call to function RIPAL down the tree. "nodeBox" is the intersection of the current "nodePiece" and the it's parents nodeBox. This is the same "nodeBox" previously defined with respect to FIG. 6. The values of points inside a nodeBox are given by the sum of the interior functions of each contributing nodePiece up the tree. The expression nodeBox→wt refers to the maximum weight of all such points, based on this combined function.

The main function, IPAL, sets up the root node and launches the recursive call to RIPAL down the tree. The nodeBox at the root node is the entire decision space, given by the globally accessible value universe. The variables bestBox, best, and uninitialized are also, for simplicity here, assumed to be globally accessible. The value, best, indicates the value of the maximum point within the working solution, bestBox. No initial best value is given, so when uninitialized, is true, the first leaf node will become the working solution, regardless of value. In FIGS. 10B and 10C, the first part of RIPAL (lines 0–5) checks for the boundary (i.e. leaf node) condition and potentially updates the best solution.

The algorithms contained in FIG. 10A and FIG. 10B use the grid associated with each of the k objective functions to avoid as many of the m intersection tests as possible at each node. The grids are created and initialized at the beginning of IPAL (FIG. 10A, lines 1–4) for all but the first objective function. Expanding each node in the first level of the tree (lines 5–7) is done to ensure global optimality, so a grid is not created for the first objective function. p(i, j) refers to piece i from objective function j, and there are k objective functions, and m pieces in each function.

In the version of RIPAL in FIG. 10B, lines 8–11 reflect iteration through a linked list is conducted. This linked list is the subset of m pieces determined, by a call to the grid in Line 6, to intersect the nodeBox. An empty returned boxset, or the end of the linked list is detected when ibox=NULL. (Note, however, that the boxset returned in line 6 can never be empty since the nodeBox is guaranteed to be non-empty before expanding the current node, and each point in the decision space is guaranteed to be contained in one piece in each interval programming function.)

To utilize the bounding information from the grids, lines 6–15 in FIG. 10C are inserted into the previous version of RIPAL. The two bounding functions, getCheapBound and getTightBound, previously described are accessed. First the cheap, fast bound is attempted in lines 6–10, followed by the tighter, more time-consuming bound in lines 11–15 if the first one fails to find a pruning opportunity. Note that the loops in lines 6 and 11 go through all remaining levels before the total is checked against the value of best. Since a bound from any level may have a negative value, this is necessary. Otherwise, the bounding process could be interrupted if the intermediate value became greater than the value of current best solution.

An alternative method for searching through the decision space is conducting a brute force search. Brute force search through the decision space is relatively simple, perfectly accurate, but typically too slow for practical purposes. The basic idea is to march blindly from one candidate decision to the next, evaluating each point based on the set of objective functions, and keeping the best decision as the final solution. It is a useful method to implement because it provides a valuable error check of the interval programming algorithms (if one is willing to wait long enough, or if the problem is simple enough). Furthermore, the algorithm can be modified to scale back the search to a subset of the decision space, thus entering the game of accuracy vs. speed tradeoffs. With available computing power growing so rapidly, and with the subjective nature of accuracy vs. speed tradeoffs, experimental results have shown that interval programming algorithms completely dominate such brute force search in all but a fringe set of cases. Brute force methods are valuable in the case of a full search through the decision space, interval programming methods can only guarantee such perfect accuracy if each interval programming piece is a point box, one for each decision. In this extreme case, the simplicity of search through the decision space, will result in a faster solution. A basic brute force algorithm iterates through the decision space. The decision space is assumed to be finite and uniformly discrete. Without loss of generality, it can also be assumed that each variable domain contains only integer values and ranges from zero to an integer maximum.

A plane sweep algorithm can also be used to solve interval programming problems having rectilinear pieces. The algorithm was initially disclosed in Hiroshi Imai and Takao Asano, "Finding the Connected Components and a Maximum Clique of an Intersection Graph of Rectangles in the Plane," *Journal of Algorithms,* 4:310–323, 1983, which is incorporated herein by reference. This algorithm was specifically designed for finding the max-clique in an intersection graph but it can be adapted to the current invention of solving an interval programming problem having rectilinear pieces. The problem of finding the max-clique is equivalent to finding the largest set of rectangles that have a non-empty intersection. This can be easily generalized to rectangles with weights to solve rectilinear piecewise constant interval programming problems.

Figure 11A:
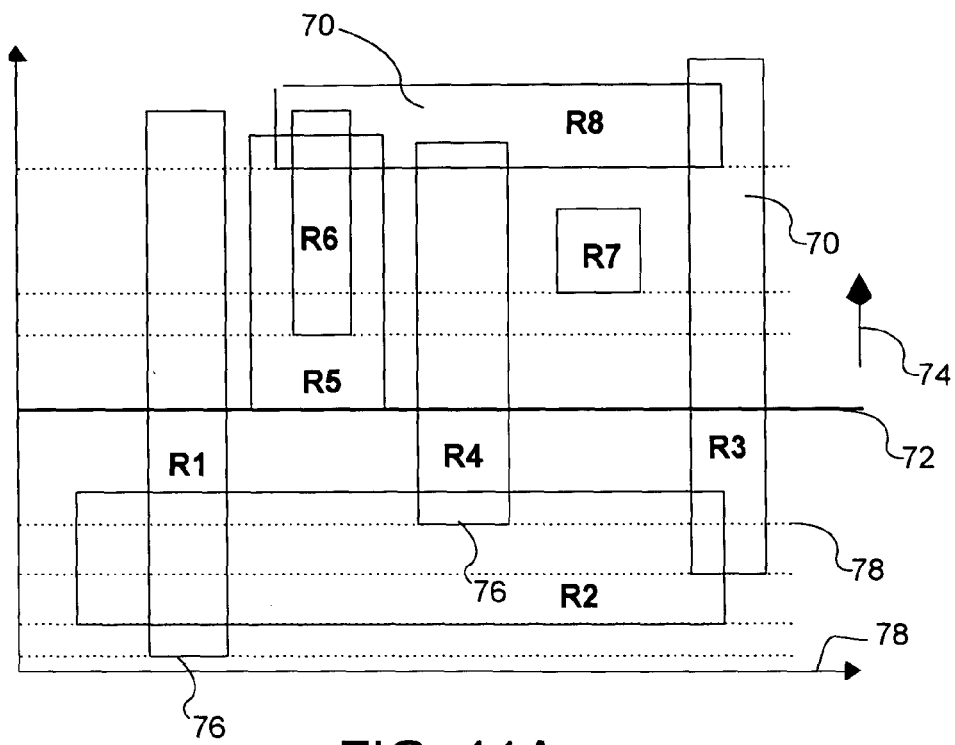
FIGS. 11A and 11B depict the plane sweep method taught by Imai and Asano.
Figure 11B:
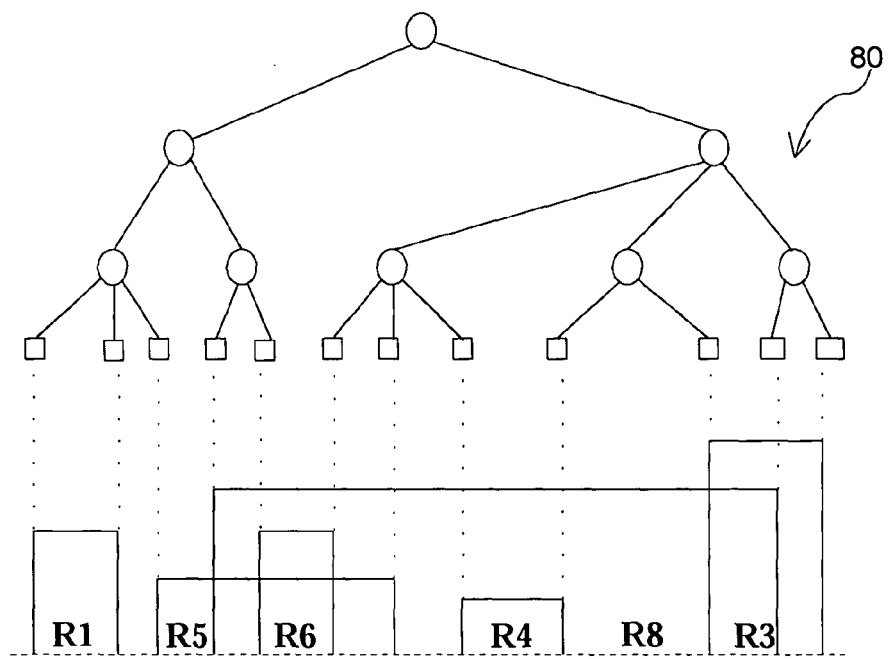

The algorithm by Imai and Asano uses a plane sweep method and a 2–3 tree, depicted below in FIGS. 11A and 11B. FIGS. 11A and 11B are provided directly in Imai and Asano referenced above. FIG. 11A shows a plurality of overlapping rectangles 70 identified individually as R1, R2, R3, R4, R5, R6, R7 and R8. A sweep line 72 proceeds through the rectangles 70 in the direction indicated by arrow 74. Lower rectangle edges 76 are indicated with dashed lines 78. FIG. 11B illustrates the 2–3 tree 80 and the corresponding rectangles. The algorithm sweeps through all but one dimension stopping at every lower edge of a rectangle and inserting and removing elements from the 2–3 tree that intersect with the sweep line. Since insertions and removals to the tree take log n time, the total time is O(n log n). In higher dimensions, this generalizes to $O(n_{d-1} \log n)$. This algorithm has been generalized to handle negative-weight rectangles, by adjusting the plane sweep progression to stop at the upper edge of each rectangle in addition to the lower edge.

The plane sweep algorithm was not designed with interval programming problems in mind, but probably in the context of quite different applications, most likely VLSI chip design. In the latter application, there is no a priori knowledge that two given rectangles do not intersect. Based on the definitions of interval programming problems, two pieces from the same interval programming function do not intersect. The plane sweep method does not capitalize on this knowledge. Furthermore, this method does not work properly with interval programming pieces with linear interior functions, as well as with pieces with non-rectilinear edges. Despite these limitations, it is a useful method to implement as a correctness check against sufficiently small, rectilinear piecewise constant interval programming functions.

In light of the above, it is therefore understood that within the scope of the appended claims, the invention may be practiced otherwise than as specifically described.

What is claimed is:

1. A mathematical programming method for controlling a system of interest utilizing a computer comprising the steps of:

defining a common decision space by identifying decision variables as controllable parameters of the system of interest;

developing a set of objective functions as piecewise defined functions, each objective function being dependent on at least one of the decision variables such that each objective function corresponds to a goal, said objective function being based on an underlying expression, each objective function having a plurality of pieces, each piece relatable to an interior function having a piece maximum value, each objective function having only one piece for each combination of decision variables values;

establishing a priority weight for each objective function in accordance with user preference regarding the goal corresponding to the objective function;

developing a value function as a set of additive preferences based on the set of objective functions and the priority weights;

searching through the common decision space to find the values of the decision variables that maximize the developed value function; and executing the controllable parameters of the system of interest dictated by the found decision variable values.

2. The method of claim 1 wherein the interior function of each piece of the piecewise defined functions has a constant value.

3. The method of claim 2 wherein each piece is defined by a set of intervals determining a size and all pieces of each piecewise defined function have a uniform size.

4. The method of claim 1 wherein the interior function of each piece of the piecewise defined functions has a value that can be represented by a linear equation.

5. The method of claim 4 wherein each piece is defined by a set of intervals determining a size and all pieces of each piecewise defined function have a uniform size.

6. The method of claim 1 wherein each piece is defined by a set of intervals determining a size, each interval being given by a function of at least one decision variable.

7. The method of claim 1 wherein developing a piecewise defined function comprises:

starting the piecewise defined function with a single piece;

choosing a piece of the piecewise defined function;
splitting the chosen piece into at least two new pieces;
calculating new interior functions for said at least two new pieces; and
continuing said steps of choosing a piece, splitting the chosen piece and calculating new interior functions until a preselected limit has been reached.

8. The method of claim 7 wherein choosing a piece comprises:
randomly selecting a piece of the piecewise defined function;
evaluating the randomly selected piece against the empirical expression for the objective function to create a measure of error;
establishing a list of the randomly selected pieces and associated created measures of error; and
choosing the piece from the established list having the greatest measure of error as the chosen piece.

9. The method of claim 8 wherein said step of splitting the chosen piece comprises splitting the chosen piece along the longest dimension.

10. The method of claim 8 wherein said step of splitting the chosen piece comprises:
calculating outcomes from the empirical expression for every possible split dimension for the chosen piece; and
splitting the chosen piece along the dimension that results in the best calculated outcome.

11. The method of claim 1 further comprising:
providing a grid structure having a plurality of grid elements having a uniform size, said uniform size being selected for optimizing said step of searching through the decision variables; and
wherein developing a piecewise defined function comprises:
starting the piecewise defined function with pieces that conform to said uniform size;
choosing a piece of the piecewise defined function;
splitting the chosen piece into at least two new pieces;
calculating new interior functions for said at least two new pieces; and
continuing said steps of choosing a piece, splitting the chosen piece and calculating new interior functions until a preselected limit has been reached.

12. The method of claim 11 wherein choosing a piece comprises:
randomly selecting a piece of the piecewise defined function;
evaluating the randomly selected piece against the empirical expression for the objective function to create a measure of error;
establishing a list of the randomly selected pieces and associated created measures of error; and
choosing the piece from the established list having the greatest measure of error as the chosen piece.

13. The method of claim 12 wherein said step of splitting the chosen piece comprises:
calculating outcomes from the empirical expression for every possible split dimension for the chosen piece; and
splitting the chosen piece along the dimension that results in the best calculated outcome.

14. The method of claim 1 wherein said step of searching through the common decision space comprises:
building a search tree having a root node and layers of nodes where each layer in the search tree corresponds to one objective function, each node in each layer of the search tree corresponding to one piece in the objective function associated with the layer, each node being related to one parent node located on the layer closer to the root node, each node being relatable to a plurality of child nodes on the layer further away from the root node, nodes on the layer furthest away from the root node being identified as leaf nodes, each node further having a node-region shape defined by the intersection of the piece associated with the node and the node-region shape of the parent node, and has a node-region interior function determined by the sum of the interior function of said piece and the parent node's node-region interior function, and the root node having node-region shape determined by the common decision space and an interior function of zero; and
finding the values of the decision variables maximizing the developed value function is determined by finding the leaf node with a non-empty node-region containing the maximum node-region interior function value, said node-region shape being empty if said node's node-region shape and said parent node's node-region shape do not intersect.

15. The method of claim 14 wherein the step of building a search tree comprises expanding nodes having a non-empty node-region shape one node at a time, in a depth-first manner, whereby nodes having empty node-region shapes and their child nodes are left unexpanded if the node's node-region shape is empty.

16. The method of claim 14 wherein the step of finding the values of the decision variables maximizing the developed value function comprises:
maintaining a working solution value and the decision variable values giving the working solution value through the step of searching that represents the largest node-region interior function value found so far; and
expanding one node at a time for all nodes having a non-empty node-region, in a depth-first manner, by determining an upper bound for all node-region interior function values of all child nodes of the current node and leaving the current node and its child node unexpanded if the determined upper bound below the node is at moat the value of the working solution value, and said working solution value at the end of the step of expanding one node at a time giving the maintained decision variables values maximizing the developed value function.

17. The method of claim 16 further comprising:
providing a grid structure having a plurality of grids with grid elements, said grid structure occupying the common decision space, one grid being provided for each said objective function;
associating pieces from said objective function with each grid element wherein each piece shares a region of said common decision space with the grid element;
determining a list of child nodes that have non-empty node-regions for a node by utilizing the grid structures; and
utilizing said determined list of child nodes that have non-empty node-regions for a node in said step of expanding one node at a time.

18. The method of claim 17 further comprising the step of assigning grid element upper bounds to each grid element as the maximum value of all the piece maximum values associated with the pieces associated with the grid element wherein said step of expanding one node comprises utilizing said grid structure to determine an upper bound.

19. The method of claim 18 wherein determining an upper bound comprises:
obtaining individual upper bounds for each grid associated with each objective function at layers below the current node; and
summing the maximum interior function value of the node-region of the current node and the obtained individual upper bounds of the layers below to give the upper bound.

20. The method of claim 19 wherein the step of obtaining individual upper bounds comprises:
querying the grid structure with a node-region shape of the current node to determine a list of grid elements that share a region of the common decision space with the node-region shape; and
determining the individual upper bound as being the maximum of the grid element upper bounds of the determined list of grid elements.

21. The method of claim 19 wherein the step of obtaining individual upper bounds comprises the following steps:
querying the grid structure with the node-region shape of the current node to determine a list of grid elements that share a region of the common decision space with the node-region shape;
determining for each grid element in the determined list of grid elements, a subset of pieces from the grid elements associated pieces that share a region of the common decision space with the node-region shape;
determining a subset maximum value for the subset of pieces as the maximum value of the intersection of the node-region shape and the subset of pieces, said subset maximum value being obtained from the piece interior function having the greatest value in the node-region shape; and
associating the determined subset maximum value with the subset's grid element;
determining the individual upper bound as being the subset maximum value over all subset maximum values of all the determined list of grid elements.

22. The method of claim 19 wherein the step of obtaining individual upper bounds comprises the following steps;
calculating a first upper bound by:
querying the grid structure with a node-region shape of the current node to determine a list of grid elements that share a region of the common decision space with the node-region shape;
determining the first upper bound as being the maximum of the grid element upper bounds of the determined list of grid elements;
comparing the first upper bound against the value of the working solution;
calculating the individual upper bound as follows if the first upper bound is greater than the working solution:
querying the grid structure with the node-region shape of the current node to determine a list of grid elements that share a region of the common decision space with the node-region shape;
determining for each grid element in the determined list of grid elements, a subset of pieces from the grid element's associated pieces that share a region of the common decision space with the node-region shape;
determining a subset maximum value for the subset of pieces as the maximum value of the intersection of the node-region shape and the subset of pieces, said subset maximum value being obtained from the piece interior function having the greatest value in the node-region shape;
associating the determined subset maximum value with the subset's grid element; and
determining the individual upper bound as being the subset maximum value over all subset maximum values of all the determined list of grid elements.

* * * * *